United States Patent
Purdy

[11] 3,809,291
[45] May 7, 1974

[54] LIQUID PROPORTIONING SYSTEM

[76] Inventor: Chester A. Purdy, R.F.D. No. 1, Belmont, Wis. 53510

[22] Filed: Sept. 5, 1972

[21] Appl. No.: 286,200

[52] U.S. Cl............ 222/145, 119/78, 137/604, 222/386.5, 239/323, 259/4
[51] Int. Cl............................ B67d 5/60
[58] Field of Search.... 22/94, 129, 134, 145, 386.5; 259/9; 772/395; 137/604; 119/72, 74, 75, 76, 78, 79, 80; 239/310, 313, 323

[56] References Cited
UNITED STATES PATENTS

| | | | |
|---|---|---|---|
| 3,423,073 | 1/1969 | Arge | 222/94 X |
| 3,281,123 | 10/1966 | Dailey | 259/4 |
| 2,533,930 | 12/1950 | Harr | 272/145 X |

Primary Examiner—Stanley H. Tollberg
Assistant Examiner—Larry Martin
Attorney, Agent, or Firm—McNenny, Farrington, Pearne & Gordon

[57] ABSTRACT

Liquid proportioning apparatus that provides equalized hydrostatic pressure on two separate bodies of liquid and equalizes their temperature, throughout wide variations of pressure and temperature to which one of the liquids may be subjected, and that utilizes separate means for metering the two liquids in a predetermined ratio regardless of such variations in temperature and pressure, and with no moving parts. Accuracy of proportioning results from the use of hydrodynamically identical orifices (e.g., identical in both size and configuration) in separate metering means, the ratio of the number of such orifices in the separate metering means determining the proportioning of the liquids metered thereby. In specific embodiments for supplying medicated beverage to farm animals, a collapsible bag containing a concentrated medicament is at least partially submerged in water maintained under pressure so that the two liquids are in heat exchange and pressure equalizing relationship with each other. The medicament and water, at points thus substantially equalized in temperature and pressure, are separately metered from the bag and reservoir by hydrodynamically identical orifices and flow together to a drinking trough.

15 Claims, 7 Drawing Figures

LIQUID PROPORTIONING SYSTEM

PURPOSE OF THE INVENTION

This invention relates to apparatus for dispensing two or more liquids from separate reservoirs or containers in uniformly precise, predetermined proportions. The liquids are dispensed as a liquid mixture, continuously or intermittently at a variable rate as may be required.

Although it is contemplated that liquid proportioning apparatus according to the invention may be used advantageously for dispensing an accurately proportioned mixture of two or more different liquids for any desired industrial, commercial, agricultural, medical, or other purpose, with such modifications as may be required for adapting the invention to receive liquids to be mixed from available sources, to handle them as required by the environment in which the invention is to be employed, and to dispense them together as required to suit particular needs, the invention is illustrated and described in detail herein as applied to maintaining a supply of medicated drinking water to livestock, poultry, or the like.

BACKGROUND OF THE INVENTION

The proverb, "the master's eye fattens the cattle," belies the complexity of the factors which must be understood, evaluated, and applied in the large scale care and feeding of livestock or poultry with optimum results. It is well known that, even though feeders may use the same rations, the results will depend in large measure upon the adjustment of quantities and proportions of feed, water, supplements, medication, and the like, as the need may be indicated to the practiced and attentive eye of the feeder from the action of the animals in feeding and at rest, the condition of the feeding and drinking bins or troughs, the condition of the droppings, and general appearnace of the animals. Particularly in the modern, large scale, commercial handling of livestock and poultry, both while raising them for market and in the course of transporting and storing them prior to slaughtering for consumer distribution, the need for simple, reliable, inexpensive, and versatile equipment for feeding, watering, and medicating the animals has become increasingly vital, both from the standpoint of controlling cost and insuring that the required operations are performed accurately and reliably.

As is well known, livestock that are sick will usually drink, even though they will not eat. The watering system, therefore, offers the best opportunity for medication. It is also well known that, after being subjected to a long trip by truck or rail car, livestock arrive at a feed lot fatigued, nervous, and dehydrated. It is recognized, good practice at the receiving point, after such a trip, to have the first drinking water that the animals receive charged with electrolytes and, in some instances, with certain antibiotics or other medication.

Most modern feed lots are equipped with automatic waterers or drinking troughs for which the water from a pressurized system is piped to a tank equipped with a float-operated control valve so that, as water flowing from the tank into the trough is consumed, fresh water flows into the tank and an adequate supply of fresh water is always available. Where animals are sick, or have been delivered in a dehydrated condition after a long journey, it has been necessary to shut off the automatic water supply and use, instead, a simple bulk type supply tank containing a known or measured volume of water and mixing the desired additives therein in the particular proportions suggested by the veterinarian. Generally, medicaments are provided as concentrated aqueous solutions of finely divided solids which may be dispersed or dissolved in drinking water and are volumetrically proportioned, batchwise, into conventional, bulk drinking tanks. Utilizing a simple supply tank, it has been necessary to mix an estimated amount of medicated beverage required and to mix another batch when needed or convenient. Thus, it has been necessary to watch the consumption of medicated beverage and carefully mix only the amount of make-up required to refill the supply tank, preferably before it has been emptied.

Batchwise mixing of medicated beverages is presently practiced because of the unavailability at an acceptable cost of automatic dispensing apparatus which is both accurate and reliable in operation. From the standpoint of reliability, it is essential to avoid the accidental release of a toxic dose of medication, as well as to insure against under-dosing. Accuracy has been difficult to achieve with prior automatic equipment because the proportioning means utilized to meter the medicated beverage and diluent water must function over wide ranges of pressure and temperature of the diluent water supply.

Typically, water pressure on a farm or in a stockyard might be expected to be as high as 60–80 psig and as low as 15–20 psig. When cattle are watered, with many animals drinking at a watering trough at one time, the level may drop rapidly, and the required total flow from the water source for use as diluent may cause a significant pressure differential across the metering points, sometimes approximating the normal inlet pressure to the proportioning apparatus. Where water from the trough is depleted very slowly, on the other hand, this pressure differential may be very small.

In cold climates, the temperature of the supply water in winter may be maintained only slightly above freezing, while in summer, particularly during periods of low usage from the drinking trough, water temperatures may exceed 80°F. Water is nearly twice as viscous near freezing as it is at such higher temperatures. Such variations in viscosity coupled with other hydrodynamic effects of liquid flow through orifices decree that accurate metering of two liquids in ratios other than 1 to 1 cannot be obtained merely by ratioing the areas of corresponding orifices.

A number of reciprocable valving means are known which utilize fluid pressure for dispensing the contents of a pressurized container and have been used for dispensing liquids, as in aerosol type bombs, where precision in the proportions of the liquids to be dispensed is not vital. The instant invention is totally unrelated to such devices. Moreover, prior art liquid proportioning devices that utilize reciprocable valves and rely on the area differential between large and small orifices to dispense predetermined proportions of two liquids may involve gross inaccuracies when there are large variations in liquid pressures and flow rates, large differences in temperature (and resulting viscosity) between the two liquids, or large differentials in orifice sizes and configurations, or a combination of such differences. Also, various prior art liquid proportioning devices are subject to wear, breakage, and malfunctioning of moving mechanical parts and require excessive inspection, maintenance, and repair, to say nothing of the possibly disastrous consequences of malfunctions.

SUMMARY OF THE INVENTION

The present invention facilitates the accurate blending, in a predetermined ratio, of a primary liquid from one reservoir with a similar secondary liquid from another reservoir. This is done by maintaining the two liquids at substantially the same pressure and temperature at points where they are separately metered, simultaneously on a demand basis, through foraminous metering means. For this purpose, the metering means comprises a first orifice means adapted to meter primary liquid and a second multiple orifice means adapted to meter secondary liquid to a common distribution conduit or usage receptacle. The second multiple orifice means consists of hydrodynamic duplicates of the first orifice means, and the ratio of the numbers of orifices of identical size and configuration that constitute the first and second orifice means is determinative of the constant proportion of primary to secondary liquid in the mixed effluent flowing to the distribution conduit or usage receptacle. There are no moving parts, and the accuracy of proportioning is independent of variations in the pressure and temperature of the diluent supply and variations in the demand for the dispensed liquid mixture.

Preferably, the required common pressure of the two liquids at the metering orifices is achieved by applying the pressure of one liquid to the other. This is most conveniently done by storing one of the liquids in a collapsible or other variable volume container that is at least partially immersed in the other liquid. This also serves to equalize their temperatures.

The particular embodiments of the invention illustrated herein provide an accurate liquid proportioning device for dispensing a medicated beverage in any predetermined concentration, to animals, poultry, or the like on a demand basis, automatically. A collapsible bag containing concentrated medicament is placed in fluid-pressure communication and heat exchange relationship with a diluent liquid, such as water, that is supplied to and held in a diluent reservoir under pressure. Valve means are provided to place the medicament in fluid communication with the first orifice means to meter the medicament; the second, multiple orifice means is in constant communication with the diluent to meter it; and the discharges of the two orifice means are combined and conducted to a drinking trough. The accuracy of the proportioning is independent of the amount of the concentrate confined in the collapsible bag, until its contents are depleted, and is independent of the size of the dispensing apparatus, of the rate of consumption of medicated beverage, and of the hydrostatic pressure of the diluent supply to the diluent reservoir, so long as that pressure is positive relative to the back pressure at the orifices.

The invention, in a straightforward and simple manner, solves the foregoing problems of accurate and reliable proportioning, blending, and dispensing of two or more liquids having the same or similar viscosity characteristics. Assembly and disassembly of the particular embodiments illustrated are simple, and both lend themselves to dependable operation on a farm without requiring the services of a skilled mechanic for maintenance or for any rarely needed repair or replacement of parts.

BRIEF DESCRIPTION OF THE DRAWINGS

FIG. 1 is an elevational view, largely in vertical section, showing details of a simple embodiment of the invention as applied to dispensing medicated drinking water to animals, poultry, or the like;

FIG. 2 is an enlarged vertical section showing details of the metering assembly of FIG. 1;

DETAILED DESCRIPTION OF THE INVENTION

Figures 1, 2:
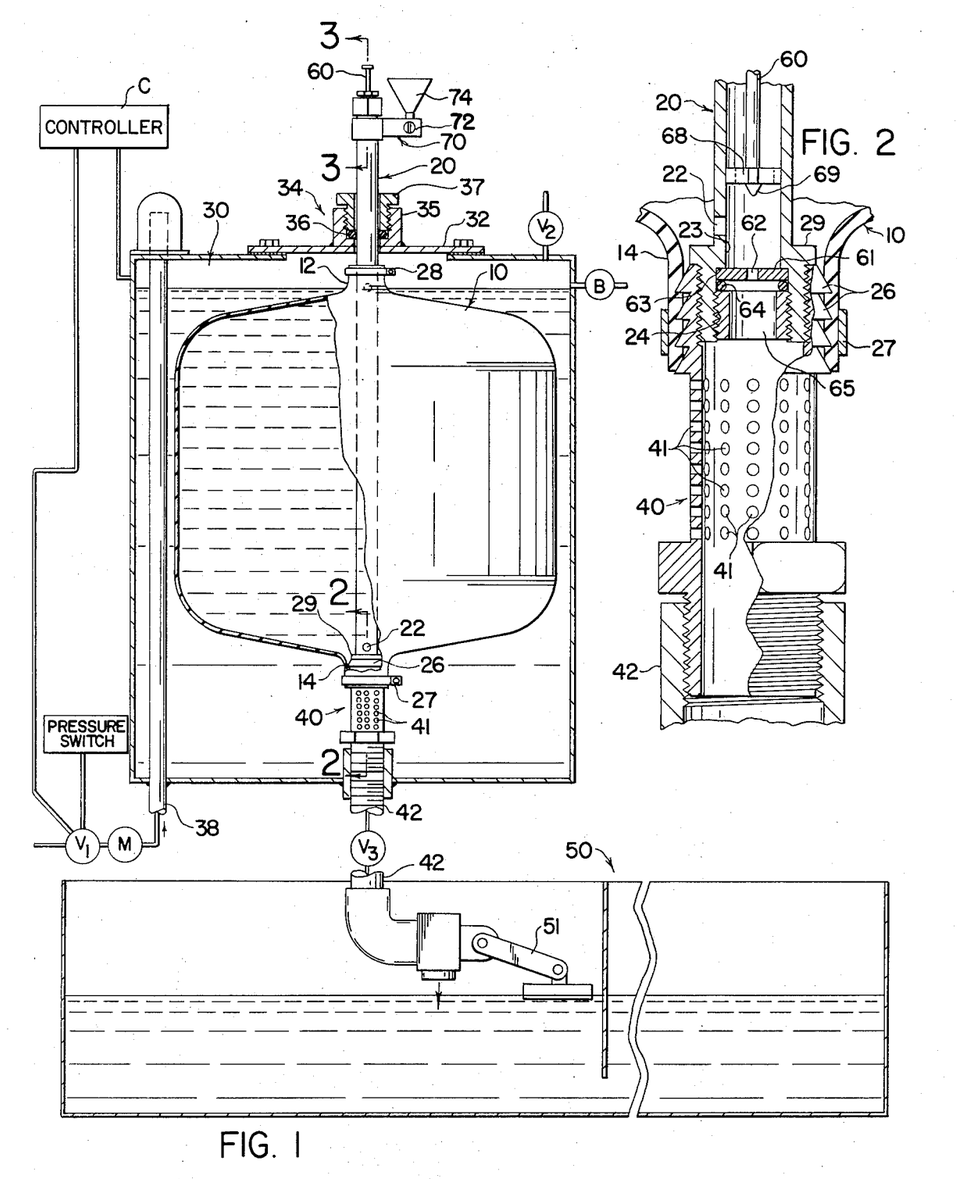

In a particular embodiment shown in FIG. 1, the liquid proportioning apparatus includes a collapsible bag or container 10 made from a flexible material such as a plastic film or relatively thin rubber. The bag is provided with a pair of oppositely disposed upper and lower openings 12 and 14, through which openings a bag filling tube 20 is inserted. The tube 20 also constitutes part of a valve and liquid metering assembly for dispensing the contents of the bag and means to precisely dispense its contents as described hereinafter. The bag 10, which is to be filled with concentrated medicament, and the associated valve and metering assembly are disposed within a water reservoir 30 from which drinking water is to be dispensed to a drinking trough 50.

As best shown in FIG. 2, the lower end of the tube 20 terminates in an integrally formed bushing 29 having an axial bore 23 and threaded counterbore 24. The bushing counterbore receives an orifice plate 61, having at least one orifice 62, the orifice plate 61 being maintained in contact with a radial shoulder 63 of the bushing and sealed about its periphery by an O-ring 64 and hollow set screw 65. As illustrated herein, the orifice plate 61 is provided with a single, central orifice 62 that also serves as a valve seat.

Depending upon the ratio of concentrate to diluent required, the plate 61 may be provided with additional orifices, all of identical cross-section. In this case, of course, a modified valve for opening and closing the additional orifices simultaneously is required.

The bushing 29 is threaded into the upper end of a cylindrical, multiple orifice means 40 in fluid-tight cooperation therewith. Stepped serrations 26 are provided about the upper end of orifice means 40 to aid in securing it in a fluid type manner within the lower opening 14 of the bag 10. A clamp 27 holds the bag opening 14 tightly against the serrations 26. Similar stepped serrations (not shown) and another clamp 28 secure the upper opening 12 of the bag 10 in a fluid-tight manner about the upper portion of the tube 20.

At least one opening 22 is provided through the wall of the tube 20 adjacent its lower end to permit concentrated liquid medication to be introduced into the collapsible bag 10 through the tube. For this purpose, the upper portion of the tube 20 protrudes through top of the reservoir 30 and is provided with means to assist in filling the bag as described hereinafter.

A poppet valve, including a valve stem 60, is axially disposed within the tube and has a peripherally fluted guide head 68 and poppet 69 at its lower end. The guide head permits liquid to pass thereby as it slides within the tube 20 for guiding the poppet 69 at the end of the stem 60 into the orifice 62 of the orifice plate 61 when the valve stem is lowered from its position shown in FIG. 2. With the valve stem in its illustrated raised position, the orifice 62 is in open fluid communication through the opening 22 with liquid in the bag 10. The poppet 69, in the "down" position of the valve, maintains a fluid-tight seal with the orifice 62. The fluted periphery of the guide head 68 permits it to move through liquid in the tube 20 with little resistance.

The cylindrical multiple orifice means 40 preferably has the same wall thickness as the orifice plate 61 and is provided with multiple orifices 41 extending radially through its cylindrical wall. Each of the plural orifices 41 is substantially a duplicate in both size and configuration of the orifice 62 in the orifice plate 61, the orifice holes being small enough relative to the diameter of the cylindrical wall that the effect of the wall curvature on the orifice configuration is negligible. In a preferred embodiment, for example, where a dilution of 1 parts concentrate to 99 parts diluent is desired, a single, circular orifice 62 and ninety-nine, circular orifices 41 may be provided, all being 0.0625 in. in diameter and of the same axial length. If, for example, a concentration of 3 parts concentrate to 97 parts diluent is desired, the orifice plate 61 may be provided with three orifices 62, each of identical cross section, and the orifice means 40 would then be provided with ninety-seven orifices 41, each of the same cross section as each of the three orifices in the orifice plate. It is not essential that the peripheries of the orifices 41 and 62 be circular so long as they are all of the same configuration and area; the peripheries may be polygonal, elliptical, or of any other configuration. By having all of the orifices 41 and 62 essentially identical, liquid of a given viscosity at any given pressure will flow through each of them at the same rate.

The axial bore of the orifice means 40 provides a mixing chamber for liquid flowing through the orifice 62 from the bag 10 and for liquid flowing through the multiple orifices 41 from the reservoir 30, the ratio of the two liquids being that predetermined by the numbers of orifices in the orifice plate 61 and multiple orifice means 40, as explained above.

The lower end of the multiple orifice means 40 is threaded in a fluid-tight manner into an outlet pipe 42, which passes in a fluid-tight manner through the bottom of the reservoir 30. The outlet pipe 42 leads into a drinking trough through a manual shut-off valve $V_3$ and a commonly used float-controlled valve 51, the latter normally controlling the discharge from the outlet pipe to maintain the level of discharged liquid mixture more or less constant.

The reservoir 30 is provided with a fluid-tight access hatch 32 which, in turn, is provided with a sealing gland 34 to prevent leakage around the periphery of the tube 20. A simple and preferred sealing gland 34 comprises an internally threaded, hollow boss 35 in which an O-ring 36 is disposed. A cylindrical nut 37 is threaded into the boss 35 to compress the O-ring in sealing engagement with the boss 35 and tube 20.

An inlet pipe 38 from a source of water under pressure leads upwardly into the reservoir from the bottom thereof in permanently sealed relationship therewith and extends to near the top thereof. The inlet pipe 38 is provided with a hand-operated valve $V_1$, for convenience in operation, to control the flow to the reservoir. It is expected that water will be supplied from a private or public system with pressure regulated within a suitable range. The volume of reservoir 30 and that of compression chamber 31 (FIG. 4) is each designed so as to maintain a suitable air space above the water level. For installations where input pressures are not regulated, pressure in the reservoir may be regulated in a conventional manner for water system storage tanks. In those instances where a complex and expensive control system is justifiable, an automatic valve $V_1$ in the pipe 38 may be electrically energized through a pressure responsive controller C to regulate the pressure within chosen limits.

Figure 3:
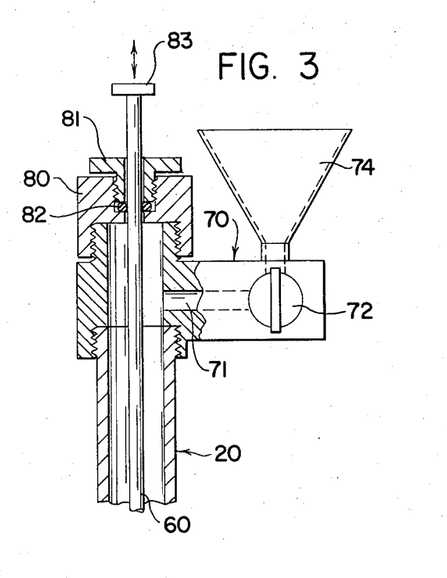
FIG. 3 is an enlarged elevational view, partly in vertical section, showing details of the device of FIG. 1 for filling the collapsible bag and for sealing the valve actuator that is manipulated for activating and deactivating the medicament dispensing part of the device.

Referring now to FIG. 3, the upper end of the tube 20 is provided with a radially extending valve body 70 threaded thereon and having a vertical bore accommodating the poppet valve stem 60 and a lateral bore 71 communicating with the vertical bore. With the valve $V_1$ closed, a manually operable valve 72 selectively places a funnel 74 in communication with the lateral bore 71. When the poppet valve stem 60 is lowered to close the orifice 62 in the orifice plate 61, and a manually operated valve $V_2$ in the top of the reservoir 30 is opened to relieve the air pressure therein, the valve 72 may be opened to provide an open passage from the funnel 74 through the tube 20 into the bag 10 for filling or refilling the same.

It will be recognized that the annular opening between the valve stem 60 and the tubular guide 20 must be sealed at its upper end while the apparatus is in operation. For this purpose, a sealing gland body 80 is threaded onto the valve body 70 and a cylindrical nut 81 is threaded into the gland body and against an O-ring 82 seated therein to seal about the poppet valve stem 60. For convenience and economy of manufacture, assembly, and service, both a handle 83 and the fluted guide head 68 and poppet 69 are preferably threaded or otherwise removably mounted on the stem 60.

Figure 4:
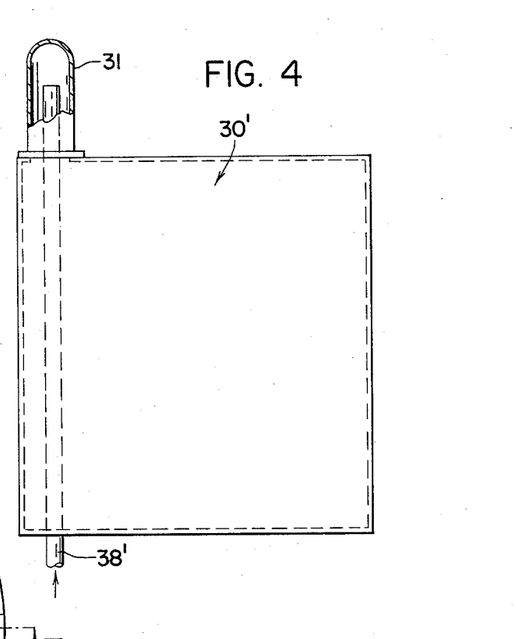
FIG. 4 is an elevational view partly in vertical section, showing the air compression chamber of FIG. 1 that prevents siphonage from the diluent reservoir.

FIG. 4 illustrates how, if desired, an air compression chamber 31 (not shown to scale), sufficiently large so as to extend above all the fluid-tight seals which might leak, and an upwardly extended inlet pipe 38' may be arranged about an opening in the top of a reservoir 31' to provide adequate air space to safeguard against back-flow from the reservoir through the inlet pipe. A check valve (not shown) may be provided, preferably at the top of the inlet pipe 38, as an alternative or an additional means of safeguarding against back-flow. Depending on the conditions of a particular installation, any of a variety of check valve means may be used.

Since the described apparatus maintains a predetermined ratio of discharge of liquids from the bag 10 and reservoir 30, the amount of liquid discharged from the bag 10 and a need to refill it may be directly indicated by a suitably calibrated, resettable, flow meter M inserted in the pipe 38 (FIG. 1). Such a meter may be calibrated to respond to the cumulative total flow of water into the reservoir 30 while visually indicating total flow of liquid out of the bag 10 and would be set at zero after each filling of the bag 10. Other means for determining the need to replenish the liquid in the bag 10 are discussed in connection with the embodiment shown in FIGS. 5–7.

Starting with the valve $V_1$ closed and with the water in drinking trough 50 at a low level, or with float 51 depressed and the bag 10 and reservoir 30 empty, the device of FIGS. 1–3 is placed in operation by first opening the valves $V_2$ and 72 and closing the orifice 62 by lowering the poppet valve rod 60. If a shut-off valve $V_3$ is provided, it is closed. A measured quantity of concentrated medicament is then poured into the funnel 74, from which it flows through the tube 20 into the bag 10. The valve 72 is then closed and the valve $V_1$ is opened for initially charging the reservoir 30 with water from the supply pipe 38 at the supply line pressure. While water is supplied to the reservoir, air is bled out of the valve $V_2$ until a discharge of water therefrom indicates that the reservoir 30 is full of water, whereupon the valve $V_2$ is closed. The pressure in the reservoir 30 and the bag 10 is now the same. The orifice 62 is then opened by raising the poppet valve stem 60, and the shut-off valve $V_3$, controlling flow to the drinking trough 50, is opened to permit flow from the bag 10 and reservoir 30 through their respective discharge orifice means into the trough in the predetermined proportions established by the orifice means. At the same time, the flow meter M, if used, is set at zero for registering the withdrawal of medicament from the bag 10. Continued operation of the device will automatically meter additional medicament and water in the same predetermined proportions from the bag 10 and reservoir 30 and through the outlet pipe 42 to maintain the level in the trough 50 within the range established by the float-operated valve 51.

It will be appreciated, in some installations it is possible that some air may be entrained with the water flowing to the reservoir 30 and build up a gradually increasing air space above the water level therein, thus gradually causing a lowering of the water level. If this should be permitted to continue unchecked, the water level in the reservoir 30 might eventually fall well below the level of medicament in the bag 10 and even below some of the orifices 41 of the multiple orifice means 40, thus causing the device to malfunction. Normally, the periods between refillings of the medicament bag 10 will not be so great as to create any such problem. However, where the problem may arise, a conventional, automatic, air-bleeder B may be mounted on the sidewall of the reservoir 30 in communication with the interior thereof and at a suitable minimum level of liquid to be maintained in the reservoir, preferably at or slightly above the top of the bag 10.

The measured quantity of concentrated medicament initially poured through the funnel 74 and into the bag 10 should be a quantity predetermined to substantially fill the bag 10 up to, but not above, its upper opening 12, and not above the level of the air-bleeder B if one is employed. This will insure that the medicament level in the bag 10 never exceeds the water level in the reservoir 30, and the pressure of the medicament in the bag 10 at any level therein will always be precisely the same as the pressure of water in the reservoir 30 at that level. At the same time, since the bag 10 is completely surrounded by the water in the reservoir 30, medicament in the bag is in effective heat exchange relationship with the surrounding water and will normally be automatically maintained at the same temperature as the surrounding water so that operation of the metering orifices will never be affected either by temperature-induced, liquid viscosity changes or by pressure differentials in the system.

At any time that it is desired to terminate the medication of drinking water discharged into the trough 50, simply closing the orifice 62 by lowering the poppet valve stem 60 seals the remaining medicament in the bag 10 and permits continued flow of unmedicated drinking water from the reservoir into the trough. When this is to be done, the reading of the flow meter M should be noted at the time the flow of medicament is terminated, and it should be reset to that reading when the flow of medicament is resumed, or the bag 10 should be refilled and the meter M reset at zero when the flow of medicament is resumed.

Under normal operating conditions, although the medicament in bag 10 is in communication with the water in the reservoir 30 through the orifice 62 and multiple orifices 41, diffusion of medicament through the open orifices into the water in the reservoir is minimal and generally negligible. However, should significant periods of idleness occur during which drinking water to the trough is not medicated, good management would dictate that orifice 62 be closed. If desired, any of various types of interlocks known to those skilled in the art may be employed.

Tests have indicated that the precision with which medication may be metered into drinking water discharged from the apparatus described above is far in excess of that required for most applications. The ability to obtain such precision with such simple and maintenance-free apparatus, involving no moving parts, will have similar applications in many other arts with significant advantages in cost and operation compared to any previously available liquid proportioning of which I am aware. A particular advantage of the device described above is the simplicity of the various component parts thereof that adapts them for manufacture from a variety of construction materials to suit the particular application needs, including high strength materials where high pressures may be involved and corrosion resistance materials where required by the character of the liquids being handled. In all instances in which special requirements do not impose a need for exceptionally high material strengths, the disclosed device may be fabricated substantially entirely from inexpensive, molded plastic parts, having fiber reinforcement where the need is indicated.

The size of devices of the type disclosed may vary according to the need. A collapsible bag with a one gallon capacity for concentrated medicament may be a desirable size for supplying medicated drinking water to poultry and swine. For cattle, a bag capacity of 7 to 10 gallons may be more suitable and, obviously, much larger bags may be employed where large volume usage is required. Since the medicament concentration will commonly be of the order of one part to 100 parts of water, a medicament bag holding 10 gallons of medicament may provide of the order of 1000 gallons of medicated drinking water before replenishment is required. When such replenishment is required, it is only necessary to close the medicament orifice 62 by lowering the poppet valve stem 60, close the shut-off valve $V_3$, and open the air-bleeder valve $V_2$ and filling valve 72. When the bag has been recharged with medicament, these four valve manipulations are simply reversed to place the device back in operation, and the flow meter M is reset to zero for monitoring the continued consumption of medicament.

Figure 5:
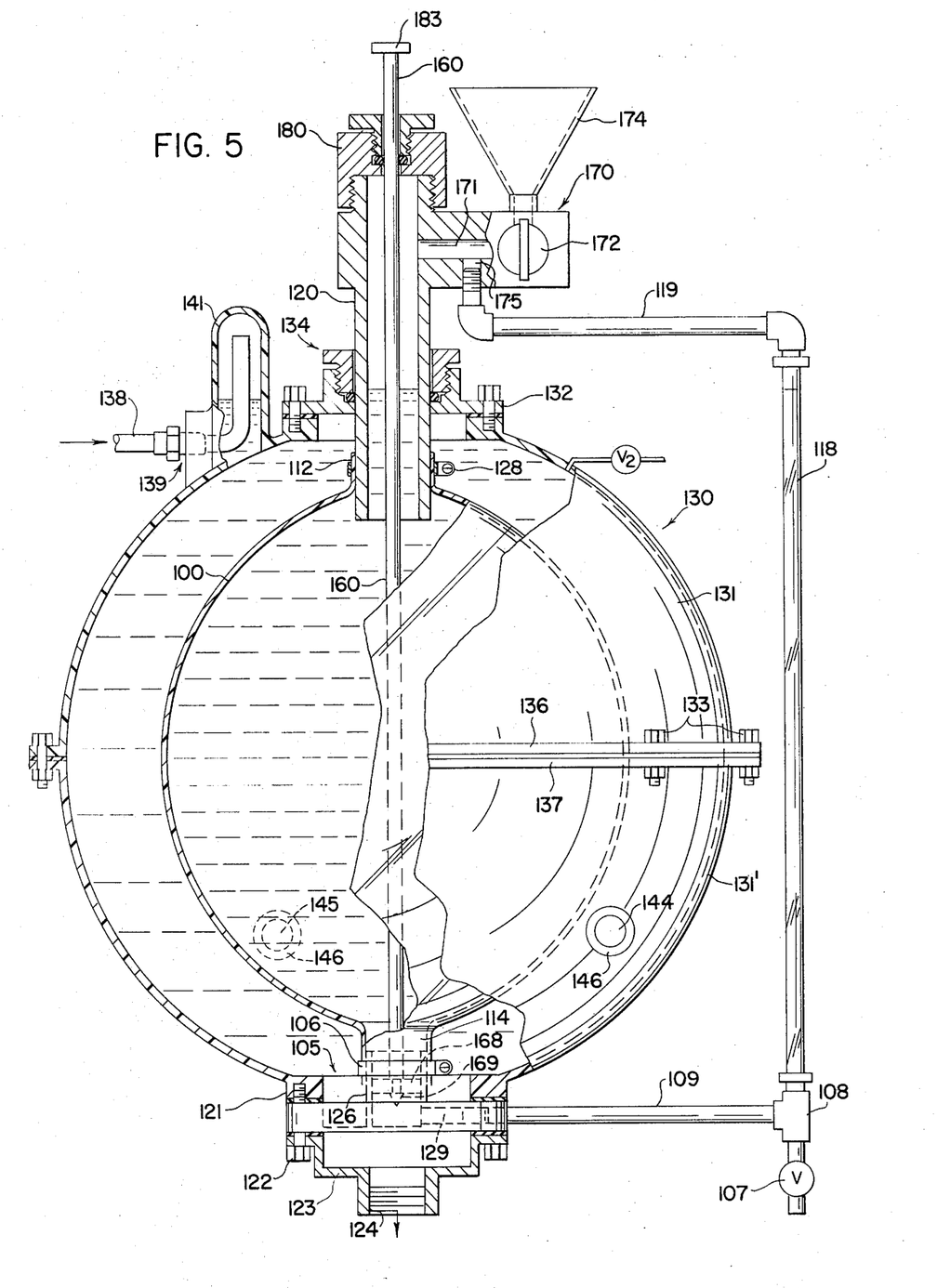
FIG. 5 is a view similar to FIG. 1 of a more refined and preferred embodiment of the invention.

In a more refined and preferred embodiment of the present invention, shown in FIG. 5, a spherical water reservoir 130 preferably includes an upper hemispherical section 131 and a lower hemispherical section 131' held together in a manner permitting ready disassembly, as by circumferentially disposed bolts and nuts 133, a known type of peripheral clamp, or other locking means acting on upper and lower coupling flanges 136 and 137 to maintain the hemispherical sections in fluid-tight engagement. Th hemispherical sections 131 and 131' are preferably made from a fiber-reinforced plastic such as a glass fiber reinforced polyester resin or the like conventionally used for making water tanks. A collapsible bag 100 having an upper inlet opening 112 and a lower outlet opening 114 is disposed within the spherical reservoir 130. The inlet opening 112 of the collapsible bag 100 is removably disposed on the lower end of a bag filling tube 120, to be described more fully hereinafter, and is maintained in fluid-tight relationship therewith by means of a clamp 128. The upper end of the bag-filling tube 120 is provided with a radially extending valve body 170 having a vertical bore accommodating a poppet valve stem 160 and a lateral bore 171 communicating with the vertical bore. A manually operable valve 172 selectively places a funnel 174 in communication with the lateral bore 171. When the poppet valve stem 160 is lowered to close a central 125 in a ratio plate 140, and a manually operated valve $V_2$ in the top of the reservoir 130 is opened to relieve the air pressure therein, the valve 172 may be opened to provide an open passage from the funnel 174 through the tube 120 into the bag 100, for filling or refilling the same.

The annular opening between the valve stem 160 and the bag-filling tube 120 is sealed as in the embodiment of FIGS. 1 to 4 by a similar sealing gland 180, and the tube 120 passes through a suitable sealing gland 134 in a fluid-tight access hatch 132.

The outlet opening 114 of the collapsible bag is removably disposed on a discharge means to be described more fully hereinafter, shown generally at 105, and is maintained in fluid-tight relationship therewith by means of a clamp 106.

A watch glass 118 is adapted to be placed in open fluid communication with the lateral bore 171 through a conduit 119 connected at one end with appropriate fittings to the upper end of the watch glass, and threaded at the other into a vertical bore 175 communicating with the lateral bore 171 in the valve body 170. The lower end of the watch glass is secured in a tee 108 and is in fluid communication with the bottom of the bag 100 through the discharge means 105 as described more fully hereinafter. The tee 108 is provided with a drain-cock 107 to drain concentrated medicament from the bag.

Figure 6:
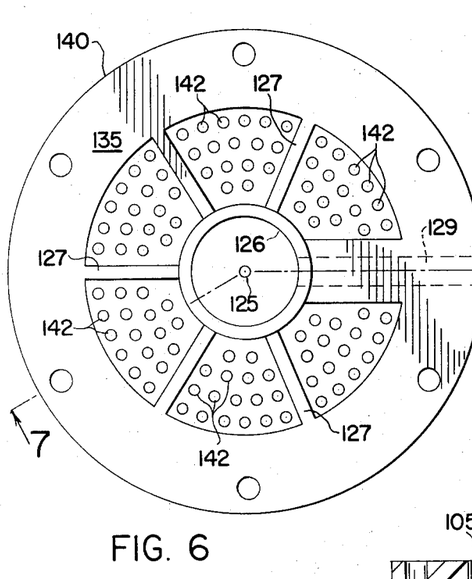
FIG. 6 is an enlarged plan view of the preferred arrangement of primary and secondary orifices in a unitary proportioning plate in the device of FIG. 5.
Figure 7:
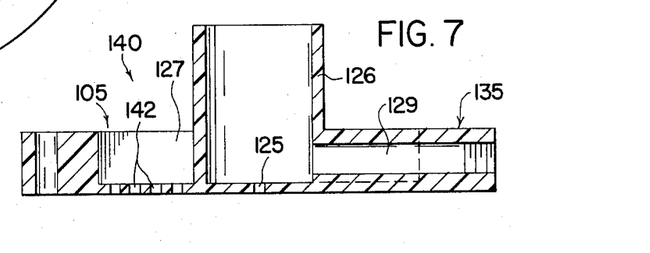
FIG. 7 is a similarly enlarged vertical sectional view of the proportioning plate of FIG. 6, taken as indicated by the line 7—7 in FIG. 6.

Referring now to FIGS. 6 and 7 together with FIG. 5, the discharge means 105 comprises a ratio plate 140 that is removably mounted across a circular boss 121 at the bottom of the reservoir 130. The boss 121 receives a plurality of bolts 122 for securing the ratio plate 140 in fluid-tight engagement between the boss and a skirted cap 123. The cap 123 is provided with a threaded opening 124 for the discharge conduit (not shown) that feeds to a drinking trough or the like through a manual shut-off valve and float-controlled valve as described in the embodiment of FIGS. 1 to 4.

The ratio plate includes a first orifice means comprising a single central orifice 125, and a second orifice means comprising a multiplicity of orifices 142, of the same size and configuration as the central orifice 125, disposed in an essentially flat, circular plate 135 of substantially uniform thickness. The first orifice means and a second orifice means are thus in isobaric relationship. The orifice 125 and orifices 142 are hydrodynamically identical, and discharge into the cap 123 from which the mixture of liquids metered by the two orifice means flows to the drinking trough.

The ratio plate 140 is provided with a hollow central hub 126 from which ribs 127 radiate. The ribs 127 provide strength to the central portion of the ratio plate which, in this particular embodiment, is perforated with ninety-nine orifices. The central hub 126 communicates with the radially extending passage 129 which is threaded at its outer end to receive one end of the conduit 109 so as to place the sight glass 118 in open fluid communication with the lower end of the bag 100.

The reservoir 130 also may be provided with a pair of windows 144 and 145 disposed in the lower hemispherical section 131' and on opposite sides of it and in alignment with each other to illuminate the interior of the reservoir and permit the fullness of the bag 100 to be visually checked by sighting through one of the windows in the direction of the other. Since the liquid levels in and outside of the bag 100 are constant until the bag is essentially empty, the bag collapses laterally as its contents are exhausted and gathers tightly around the poppet valve stem 160 when empty, as is thus made observable. In some instances it may be desirable to use the windows and dispense with the sight glass, or vice versa. It is most preferred to use both as illustrated in FIG. 5.

The windows 144 and 145 may be formed in the lower hemispherical section 131' in any known manner which will depend, to some extent, on the choice of material for the section 131'. When the section 131' is made of glass fiber reinforced plastic, the hemispherical section 131' is preferably fabricated with its wall thickened sufficiently at 146 around the periphery of the window locations to facilitate mounting such a window of sufficient strength to withstand line pressure shocks in the water supply line.

The valve stem 160 has a peripherally fluted guide head 168 and poppet 169 at its lower end as also shown, in more detail, in FIG. 2. The guide head permits liquid to pass therethrough as the guide head slides within the central hub, thus guiding the poppet 169 at the lower end of the stem 160 into the single orifice 125 when the valve stem is lowered into the position shown in FIG. 5. When the valve stem is in a raised position, the orifice 125 is in open fluid communication with liquid in the bag 100.

An inlet pipe 138 from a source of water under pressure leads into the upper hemispherical section 131, through any suitable fitting 139, into and upwardly within a pressure chamber 141 to near the top thereof to guard against back-flow from the reservoir 130 through the inlet pipe. Additional or alternative means for safeguarding against back-flow as described hereinbefore may be used, if desired.

This more refined embodiment of the liquid proportioning means is placed and maintained in operation in essentially the same manner described for the device illustrated in FIGS. 1 to 4. It will be apparent that the use of a planar ratio plate in this refined embodiment, however, more precisely equalizes the fluid pressure on every orifice; since the orifices are all of identical diameter and are all provided in plate of uniform thickness, they are all hydrodynamically identical and, therefore, ensure a precisely determined ratio of dilution.

The invention is not restricted to the slavish imitation of each and every detail set forth above. Obviously, devices may be provided which change, eliminate, or add certain specific details without departing from the scope of the invention.

What is claimed is:

1. Liquid proportioning apparatus for dispensing a liquid concentrate diluted with a liquid diluent to a desired predetermined concentration, comprising, in combination, a reservoir for dispensably confining said diluent and a container for dispensably confining said concentrate in fluid-pressure communication with said diluent, first orifice means for metering concentrate from said container, and second multiple orifice means for metering diluent from said reservoir, said second orifice means consisting of multiple hydrodynamics duplicates of said first orifice means whereby the ratio of the discharge rates of a particular concentrate and a particular diluent is determined by the ratio of the number of orifices in said first orifice means to the number of orifices in said second orifice means.

2. The apparatus of claim 1 including means to indicate the amount of liquid concentrate remaining in said container.

3. The apparatus of claim 1 including supply means to continuously supply said liquid diluent to said reservoir.

4. The apparatus of claim 1 including means to prevent siphonage of said liquid diluent from said reservoir through said supply means.

5. Liquid proportioning apparatus for dispensing a liquid concentrate diluted with a liquid diluent to a desired predetermined concentration, comprising, in combination, a reservoir for dispensably confining said diluent under pressure and a collapsible container for dispensably confining said concentrate under pressure in fluid-pressure communication with said diluent and in heat-exchange relationship therewith, first orifice means for metering concentrate from said collapsible container, second multiple orifice means for metering diluent from said reservoir, and means receiving the discharges of said first and second orifice means, said second orifice means consisting of multiple duplicates in both size and configuration of said first orifice means whereby the ratio of the discharge rates of a particular concentrate and a particular diluent is determined by the ratio of the number of orifices in said first orifice means to the number of orifices in said second orifice means substantially independently of fluctuations in said pressure and temperature of said diluent.

6. The apparatus of claim 5 including means to indicate the amount of liquid concentrate remaining in said container.

7. The apparatus of claim 5 including supply means to continuously supply said liquid diluent to said reservoir.

8. The apparatus of claim 5 including means to prevent siphonage of said liquid diluent from said reservoir through said supply means.

9. Liquid proportioning apparatus for dispensing a liquid concentrate diluted with a liquid diluent to a desired predetermined concentration, comprising, in combination, a reservoir for dispensably confining said diluent under pressure and a collapsible container for dispensably confining said concentrate under pressure in fluid-pressure communication with said diluent and in heat-exchange relationship therewith, first orifice means for metering concentrate from said collapsible container, second multiple orifice means for metering diluent from said reservoir, a ratio plate in which said first and second orifice means are isobarically disposed, and means receiving the discharges of said first and second orifice means, said second orifice means consisting of multiple duplicates in both size and configuration of said first orifice means whereby the ratio of the discharge rates of a particular concentrate and a particular diluent is determined by the ratio of the number of orifices in said first orifice means to the number of orifices in said second orifice means substantially independently of fluctuations in said pressure and temperature of said diluent.

10. The apparatus of claim 9 including means to indicate the amount of liquid concentrate remaining in said container.

11. The apparatus of claim 9 including supply means to continuously supply said liquid diluent to said reservoir.

12. The apparatus of claim 9 including means to prevent siphonage of said liquid diluent from said reservoir through said supply means.

13. A liquid proportioning apparatus for dispensing a concentrated medicament diluted with drinking water to provide a medicated beverage of predetermined concentration for animals, comprising, in combination, a reservoir for dispensably confining the water under pressure, a collapsible container disposed within said reservoir for dispensably confining said concentrate in said container under pressure and in fluid-pressure communication and heat-exchange relationship with water in the reservoir, means to replenish said container, first orifice means for selectively metering concentrated medicament from said container, and second multiple orifice means for metering water from said reservoir, said second orifice means consisting of multiple duplicates in both size and configuration of said first orifice means disposed adjacent said first orifice means, whereby the ratio of the discharge rates of a particular medicament and water is determined by the ratio of the number of orifices in said first orifice means to the number of orifices in said second orifice means substantially independently of fluctuations in said pressure, the temperature of the water, or in the demand for medicated beverage, means for receiving the discharges of said first and second orifice means, means to indicate the amount of concentrated medicament remaining in the container, supply means to continuously supply the water under pressure to said reservoir, and means to prevent siphonage of water from said reservoir through said supply means.

14. Liquid proportioning apparatus for dispensing a liquid concentrate diluted with a liquid diluent to a desired predetermined concentration, comprising, in combination, a reservoir for dispensably confining said diluent and a container for dispensably confining said concentrate in fluid-pressure communication with said diluent, first orifice means for metering concentrate from said container, second multiple orifice means for metering diluent from said reservoir, said second orifice means consisting of multiple duplicates in both size and configuration of said first orifice means whereby the ratio of the discharge rates of a particular concentrate and a particular diluent is determined by the ratio of the number of orifices in said first orifice means to the number of orifices in said second orifice means, conduit means to receive, mix, and dispense the liquids discharged from both orifice means, and a valve in said conduit means operable to restrict the total flow from said orifice means into and through said conduit means according to demand.

15. A liquid proportioning apparatus for dispensing a concentrated medicament diluted with drinking water to provide a medicated beverage of predetermined concentration for animals, comprising, in combination, a reservoir for dispensably confining the water under pressure, a collapsible container disposed within said reservoir for dispensably confining said concentrate in said container under pressure and in fluid-pressure communication and heat-exchange relationship with water in the reservoir, means to replenish said container, first orifice means for selectively metering concentrated medicament from said container, and second multiple orifice means for metering water from said reservoir, said second orifice means consisting of multiple duplicates in both size and configuration of said first orifice means disposed adjacent said first orifice means, whereby the ratio of the discharge rates of a particular medicament and water is determined by the ratio of the number of orifices in said first orifice means to the number of orifices in said second orifice means substantially independently of fluctuations in said pressure, the temperature of the water, or in the demand for medicated beverage, means to indicate the amount of concentrated medicament remaining in the container, supply means to continuously supply the water under pressure to said reservoir, means to prevent siphonage of water from said reservoir through said supply means, conduit means for receiving, mixing, and dispensing the discharges of said first and second orifice means, and a valve in said conduit means operable to restrict the total flow from said orifice means into and through said conduit means according to demand.

* * * * *